June 1, 1937. H. McCORNACK 2,081,947
DAIRY PLANT
Filed March 1, 1933 12 Sheets-Sheet 1

Fig. 1.

INVENTOR
Herbert McCornack
BY
Moses & Nolte
ATTORNEYS

INVENTOR
Herbert McCornack
BY
Moses & Nolte
ATTORNEYS

June 1, 1937.　　　H. McCORNACK　　　2,081,947
DAIRY PLANT
Filed March 1, 1933　　12 Sheets-Sheet 5

INVENTOR
Herbert McCornack
BY
Moses & Nolte
ATTORNEYS

June 1, 1937.  H. McCORNACK  2,081,947
DAIRY PLANT
Filed March 1, 1933  12 Sheets-Sheet 9

INVENTOR
Herbert McCornack
BY Moses & Nolte
ATTORNEYS

June 1, 1937.　　　H. McCORNACK　　　2,081,947
DAIRY PLANT
Filed March 1, 1933　　12 Sheets-Sheet 12

Fig. 25.

INVENTOR
Herbert McCornack
BY
Moses & Nolte
ATTORNEYS

Patented June 1, 1937

2,081,947

UNITED STATES PATENT OFFICE

2,081,947
DAIRY PLANT
Herbert McCornack, Glen Ridge, N. J.

Application March 1, 1933, Serial No. 659,052

12 Claims. (Cl. 31—58)

My invention relates to improvements in facilities for sheltering, feeding, milking cows, caring for the milk and conserving the fertilizer values of the manure.

An important feature of the invention comprises improvements in plants for milking cows by machine, particularly that type of milking plant in which the cows enter the milking stalls from the side opposite to the milking machine operator. This part of the invention is designed especially as a complement to the milking machine disclosed in my Patents No. 1,859,213 and No. 1,859,214, although it may be employed with other types of milking machines.

The comprehensive objects of my invention are to save labor, to keep stable and human impurities out of the milk, to increase milk production, to promote the health of the cow's udder by facilitating the application of the calf-like agitation of the milking machine disclosed in my patents aforesaid, to provide improved arrangements for sheltering and feeding the cows, for handling the milk and for disposing of the manure and utilizing the valuable constituents thereof.

I attain these objects by the following novel features:

A basic novel feature of this dairy plant is the arrangement of milking stalls by which the cows' heads overlap the hips of the cows in front of them on the side next to the milking machine operator. By this arrangement the distance which the operator has to travel from cow to cow and from the cows to the point where the milk is emptied is made considerably shorter than in prior practice. An important provision in this overlapping arrangement of stalls is the interposition of sanitary shields or guards between the hips of the cows and the overlapping heads of the cows at their rears. Another important feature in this connection is the provision of feed boxes mounted upon said shields which serve not merely as feed boxes, but, in this overlapping of stalls, provide protection for the operator from the heads of the cows at the rear when he is milking.

Another feature which contributes essentially to the overlapping arrangement of milking stalls is the milking bench, which elevates the cow's udder to a height about four feet above the operator's floor, where the operator standing erect can reach it and attach the milking machine and which also lifts the feed box and the cow's head out of the way of the operator while he is milking the next cow.

Another feature of this plant is the preferred circular arrangement of milking stalls and provision within the circle of stalls for emptying and weighing the milk and transferring it to the milk room, thus reducing the travel of the milking machine operator to the minimum.

Another feature of improvement in this dairy plant is the provision of means for controlling the entrance of the cows into the milking room. This consists in its preferred form of an entrance door and a curtain or other suitable form of barrier across the approach to the entrance door and a pull cord, electric switch or other means in the milking room by which the milking machine operator simultaneously opens the entrance door and drops the curtain, and reversely, means being also provided on the approach side of the entrance door by which the door is closed and the curtain is raised for the next cow. In this arrangement, as the entrance door is opened to let in the cow which is about to enter the milking room, the two-part curtain, which is weighted, falls about the middle of the cow's back and serves, not only to start her movement, but also to detain the cow which follows behind her until the entrance door is again closed and the curtain is again raised by the inspector. This scheme of control serves to keep a cow at the entrance door promptly on call by the operator in the milking room.

Another feature of my improved milking plant consists of an entrance gate to the milking stall, preferably of spring sheet material and light in weight, so arranged that when it is drawn by the operator and pressed against the cow's hip it causes her to step over toward the shield and assume a position convenient to be milked.

Another provision in this connection is a ratchet or other means for locking the gate in any desired position which thus adapts this device to cows of different size.

Still another provision is an extension of the shield or other part of the stall in front of the cow's rear foot which is next to the operator and which not only protects the operator from the droppings of the cow but causes the cow to place this foot in a rearward position to facilitate the application of the machine.

Another feature of my improved dairy plant is the provision for dispensing with the unsanitary and expensive stall cocks of present practice and for greatly facilitating the attachment of the milker unit to the cow. This is effected by an automatic control of air inflow to the vacuum line which is accomplished by so shaping and so disposing the connection of the vacuum line with reference to the flexible stall tube which joins it with the milker bucket, that when the stall tube is detached from the milker bucket and is allowed to hang freely from the vacuum pipe its weight serves to close the air inlet to the vacuum line and, reversely, when the stall tube is attached to the milk bucket, the inlet being thus relieved sufficiently from its weight, opens that the air flows into the vacuum line. This automatic control of the air inflow to the vacuum line is made possible by the elevated milking bench and by such location of the vacuum line connection that when the stall tube is suspended from the vacuum connection it swings clear of the operator's floor.

Another feature of improvement is the provision for so hanging up the surcingle of the milker unit as it is taken from the outgoing cow that the incoming cow, when she enters the milking stall walks directly under the surcingle located in convenient position to be attached.

Another feature is the provision of water pipes so arranged that they discharge water against and flush the surfaces of the sanitary shields and also flush the milking benches and the gutters. Each individual shield may be flushed separately but preferably the shields are flushed simultaneously by means of a common valve. It is also provided that the cow's lanes and their manure gutters are sprayed and flushed from lateral pipes in the same way.

Another feature is the arrangement of the manure gutters of the dairy plant so that they are located beyond the cows on the side opposite to the operator. The advantage of this arrangement, over prior practice, is that the milking bench and the cow lanes are more easily flushed and the cows do not have to cross the gutter in passing through the plant.

Another feature is the provision for keeping stable impurities and insects away from the milk when it is poured and transferred to the milk receiving room. This is accomplished by means of a fan which discharges pure air and maintains a clean atmosphere where the milk bucket is opened and the milk is poured and weighed and transferred to the milk receiving room.

Another feature is that this provision which protects the milk while it is being poured, weighed and transferred to the milk receiving room also efficiently ventilates the milk receiving room.

A general and comprehensive feature of improvement in this dairy plant is the convenient and concentrated location of all of the activities of the milking machine operator which makes it possible for one operator to use efficiently seven milker units simultaneously. By this concentration and convenience of the milking room facilities the work of the operator is so greatly abbreviated that he can give close attention to the functioning of the several milker units and can apply to each cow for a longer period of time the calf-like treatment of my patented milker with great advantage to milk production and to the health of the cow's udder. This great economy of effort and improvement in efficiency is effected by the combination of plant facilities, the arrangement of the milking stalls, the facilities for handling the cows, the means for flushing the plant and the means for emptying and weighing and making record of the weight of the milk from each cow and transferring it to the milk room, also the convenient grouping within the circular arrangement of milking stalls, of the instrumentalities which control the activities of the plant, a funnel for disposing of the off-standard milk, a partitioned vat for sterilizing and rinsing the teat cups, a vat for washing all milking room utensils, crocks for sterilizing all rubber parts of the milking room equipment and a cabinet for sterilizing and racking the milk room utensils.

Another feature of improvement is accomplished by providing grades of approach which bring the cows, when in their stalls, to an elevation from which the milk is carried by gravitation through the various stages of treatment in the milk room, thus dispensing with pumps or human effort to accomplish this work.

Another important feature of my dairy plant is the provision of improved means for group feeding cows. In the milking room of this plant reservoirs are provided located above the feed boxes in each of the stalls which are automatically kept full of feed by means of a conveyor, preferably a flexible screw. This feed conveyor returns the overflow or excess supply of feed to the original source of supply. Means are also provided by which a given amount of feed can be transferred by the operator as needed from said reservoirs to the feed-boxes in their respective stalls. In the shelter stables there is also provided a distributing system for distributing ground feed, chopped feed, chopped bedding, etc. to the various stables. In connection with this distributing system is a storage room for the necessary feed and bedding supplies and, in the storage room, is provided a receiving hopper to which the different kinds of feed and bedding are conveyed by a truck and into which they are shoveled for distribution to the respective hoppers provided for their storage. At the rear end of each stable is a row of storage hoppers, a hopper for each kind of feed or bedding to be used, into which their respective kinds of feed or bedding are received from the conveyor at their upper ends and discharged from their lower ends into a truck from which they are distributed to the cows.

Another feature of improvement in dairy plants is the means for conserving and applying the fertilizer values of the manure. By a system of flushing the shelter stables, the milking room and the cow lanes both the solid and liquid values of the manure are carried into a catch basin and the considerable quantity of water thus brought into the catch basin is utilized to leach out the soluble values from the manure into a sump. From this sump the dissolved values of the manure are drawn, by a suction pump into a liquid manure spreader and applied to the soil in liquid form.

In the accompanying drawings, I have shown for purposes of illustration one preferred embodiment of my invention.

Figure 6 is a vertical sectional view on line

6—6 of Figure 1, looking in the direction of the arrows;

Referring to the drawings in detail, in the particular embodiment of the invention illustrated the milking is done in a milking room 30 around which are located in circular arrangement a series of milking stalls for the cows, seven of such stalls being illustrated. These stalls are arranged on a milking bench 31 which is raised sufficiently above the operator's floor 32 of the milking room (Figure 2) as to bring the cow to a convenient height so that the operator may most readily inspect the cows' udders and teats and apply the milking units thereto. In the center of the milking room is a milk receiving chamber or room 35 and means are provided on the outer wall of this chamber for receiving the milk from the buckets, as indicated at 36 (Figures 1, 16, 17 and 18). The stalls are so arranged that the head of each cow overlaps the hind quarters of the cow ahead of her on the side towards the operator. In this way the cows stand in a position most convenient for the attachment of the milking units and are also brought as close together as possible so that the operator may reach all of the cows with the least amount of walking. Owing to this circular overlapping relation of the cows, a great economy of steps is secured and a single operator may readily take care of all the cows in a milking room of the size shown, attaching and detaching the milking units and pouring the milk from the buckets into the receiver 36, in which the milk from each cow is weighed and from which it is automatically passed to the interior of the milking chamber.

The stalls are defined by a series of shields 40, 41 and 42, all of the intermediate shields 41 being alike and serving as the rear shield for the cow on one side and the head shield for the cow on the other side. The shield 40 constitutes the rear shield for the cow nearest the entrance door and the shield 42 constitutes a head shield for the cow nearest the exit. Arms 43 and 44 are provided on the shields on the side of the cow toward the operator and the lower part of each shield is provided with a foot guard 45 which restrains the right hind foot of the cow, protects the operator from the same and also from the cow's droppings. The cow in stepping into the stall is caused by the operator to place her right hind foot in a rearward position behind the guard. The guard restrains movement of the foot, keeping the right leg out of the way and exposing the udder for ready attachment of the milking unit. Mounted about midway of each of the stalls on the side of the cow away from the operator is an upright 50 which has hinged thereto a pair of gates 51 and 52 which are preferably made of resilient material such as sheet metal. These gates may be actuated by means to be described and may be locked in closed position so as to retain the cow in the stall during milking. When the cow is to be introduced into a stall the gate 52 is closed and the gate 51 is opened, in which position it extends across the passage-way for the cow so that when a cow coming up such passage-way reaches the gate 51 she is stopped and deflected into the stall. The gate 51 is then closed and in closing it will press yieldingly against the cow's rear and gently push her into her proper place in the milking stall. After the cow is milked, the gate 52 is opened and the cow may thereupon pass out of the stall and along the passage-way to the exit.

Figures 9, 10, 11, 12:
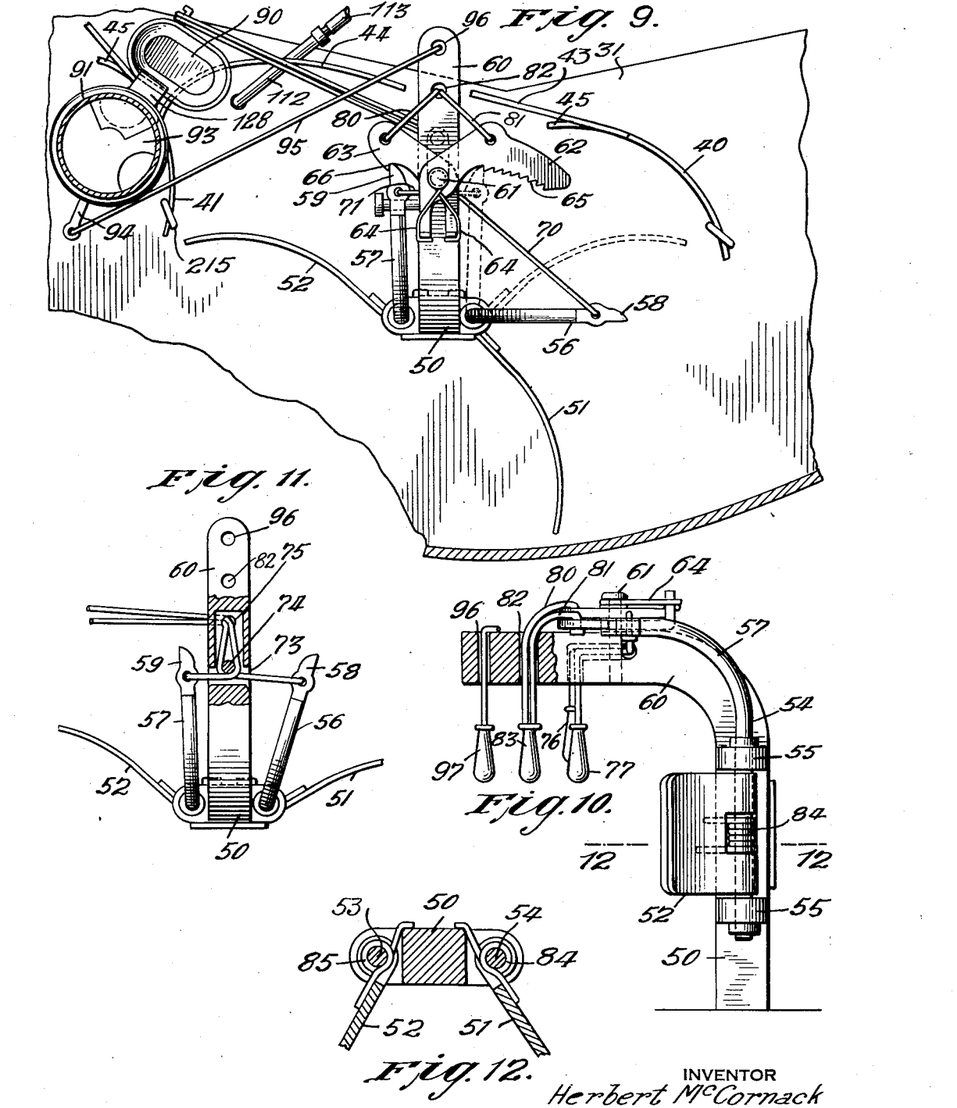
Figure 9 is a plan view showing details of parts of one of the milking stalls on a still further enlarged scale.
Figure 10 is a view in elevation, parts being shown in vertical section, of one of the stall uprights and parts carried thereby.
Figure 11 is a plan view of the parts shown in Figure 10, partly in horizontal section.
Figure 12 is a horizontal sectional view on line 12—12 of Figure 10, the ends of the flexible wings being broken away.

The means for operating the gates 51 and 52 as shown in the drawings comprise rods 53 and 54 (see Figure 12) upon which the gates are fixed, the rods being journalled in bearing brackets 55 mounted on the uprights 50. The upper ends of the rods 53 are curved as shown at 56 and 57 in Figure 10 and terminate in pointed ends or teeth 58 and 59. Each of the uprights 50 carries a laterally projecting arm 60, on which are pivoted by means of a pivot 61 a pair of latch members 62, 63, which are yieldingly urged into latching position by springs 64. The latch member 62 is provided with a plurality of ratchet teeth 65 which are adapted to be engaged by the point 58 on the curved arm 56 of the rod 54 carrying the entrance gate 51 by which means the gate may be locked in adjusted position depending upon the size of the cow. The latch 63 is provided with a single tooth 66 for engagement with the point 59 on the arm connected with the exit gate 52. Ordinarily, a single tooth 66 is sufficient for this gate, although a plurality of ratchet teeth may be provided for adjustment if found necessary. For closing the gates closing cords 70 and 71 are provided connected to the arms 56 and 57 and passing through a transverse hole 73 in horizontal arm 60 (Figure 11) around a guide pin 74 and depending through a hole 75 in the bottom of the arm 60. The ends of the cords are provided with grips 76 and 77 by which the milking machine operator may close the gates. The latches are provided with latch cords 80 and 81 which pass through a hole 82 in the arm 60 and are connected to a single grip 83 by which both latches may be simultaneously released when the gates are to be opened. The gates are provided with coiled springs 84, 85 which normally urge the gates into open position. Preferably a feed box 90 is mounted on the outside of each shield in position to receive the nose of the cow when in proper milking position in the stall. By placing a small amount of food in the feed box the cow is naturally attracted into proper milking position and is also quieted during the milking. The feed box also prevents the cow from lowering her head during the milking operation and possibly striking the operator while he is attaching a milking unit to the cow in the adjacent stall. Preferably means are provided for supplying feed to the feed boxes, such for instance, as the feed reservoirs 91 from which pipes 92 lead to the feed boxes. The feed reservoirs 91 are preferably provided with valve means indicated diagrammatically in Figure 9 for supplying a measured amount of feed to the boxes. Such valve means preferably comprise a rotary valve member 93 which may be of any suitable construction not necessary to be described in detail for delivering a measured quantity of feed, each valve member being provided with valve lever 94 to which is connected a feed valve cord 95 which passes through a hole 96 in the arm 60 and has at its end a hand grip 97 which the operator may pull whenever necessary to thereby supply a measured amount of feed to the feed box. The feed may be supplied to the feed reservoirs through a conveyor tube 98 which will be described more in detail below.

Figures 13, 15:
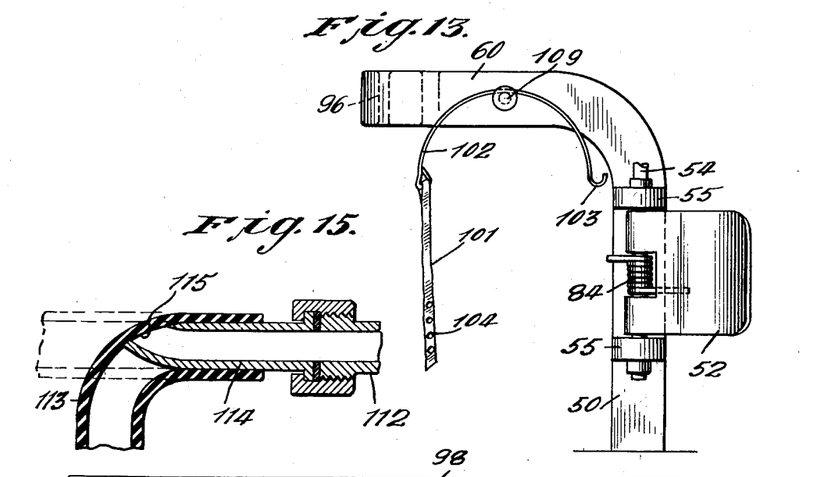
Figure 13 is a view in elevation of one of the milking stall uprights showing the surcingle hung thereon.
Figure 15 is a detail vertical sectional view showing the automatic cut-off connection for the stall tube.
Figure 14:
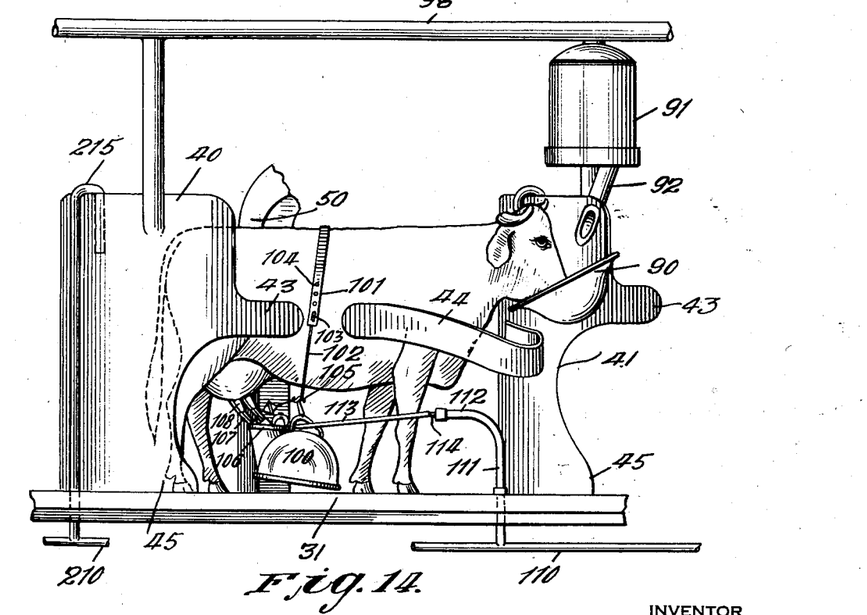
Figure 14 is a view in elevation of one of the milk stalls as seen from the side where the operator stands and illustrating a cow therein.
Figure 16:
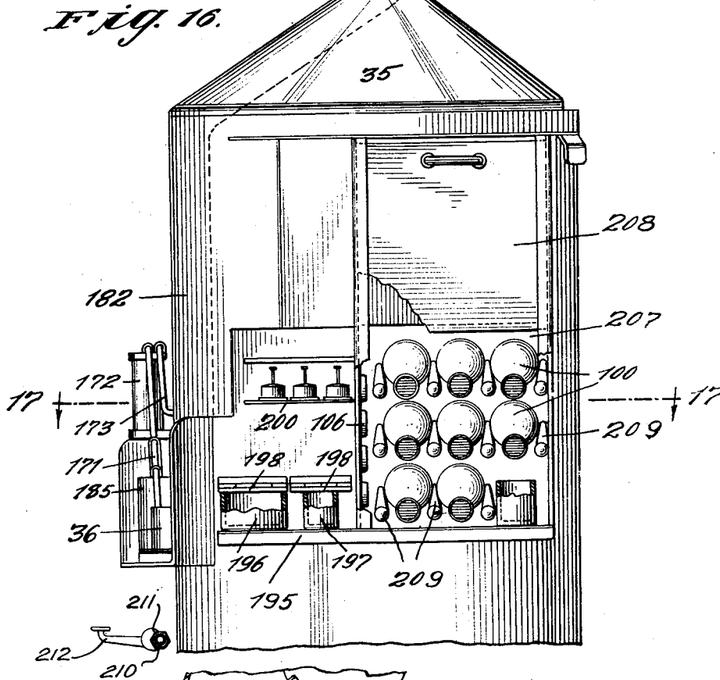
Figure 16 is a view in elevation showing the outside of the milk receiving room and showing the arrangement for holding the milking units not in use and also showing the receptacle for receiving the milk from the buckets.

The cows in the stalls described may be milked in any available manner, even by hand, when desired. Any suitable machine milking apparatus may be used for the purpose but the present construction was particularly designed for use with the milking apparatus disclosed in my patents mentioned above. Briefly, this apparatus comprises a bucket 100 which is suspended from the cow's back by means of a surcingle comprising a flexible strap 101 and a spring bow 102. The spring bow 102 has at one end a hook 103 which is adapted to be engaged with one of the holes 104 in the strap 101. The bucket is provided with a suspending hook 105 adapted to engage with the spring bow. The bucket is provided with a lid 106 to which are attached the short flexible tubes 107 of the teat cups 108. The surcingles are arranged to be suspended when not in use upon pins 109 carried by the arms 60 as shown in Figure 13. When a surcingle is suspended in this position with the bow resting upon the pin 109 the cow entering the stall will walk directly beneath the same and stop when she reaches the shield at the forward end of the stall. The operator thereupon grasps the end of the spring bow to which the flexible strap is attached and drops the spring bow over the side of the cow away from him until he can reach the hooked end 103 of the spring bow which he thereupon draws beneath the cow's belly and hooks into one of the holes 104. The surcingle is now attached to the cow and the operator hooks the bucket upon the spring bow. For supplying vacuum to the milking machine, a vacuum main 110 is provided which extends under all of the stalls and is provided at each stall with a branch 111 terminating in a horizontally bent portion 112. Secured to the end of each of the horizontally bent portions is a vacuum hose or stall tube 113 which is adapted to be attached to the pulsator on the bucket lid. The connection between the stall tube 113 and the horizontal portion 112 of the vacuum pipe is shown in detail in Figure 15 and includes a nipple 114 which is cut off on an angle at the end as indicated at 115 so that when the stall tube 113 is detached from the bucket and allowed to hang down the vacuum supply will be cut off, whereas when the tube is lifted up and connected with the bucket the vacuum connection will be established to the bucket. It is possible to cut off the vacuum in this manner because of the height of the milking bench and of the bent over portion 112 above the operator's floor 32 which permits the tube 113 to hang down and cut off the vacuum without its end reaching the floor 32. The automatic vacuum cut-off between the tube 113 and the nipple 114 obviates the necessity for using a stall cock, which is expensive, requires frequent cleaning, and requires an additional manipulation on the part of the operator. When the operator has attached the tube 113 to the bucket and thereby placed the latter in communication with the vacuum he attaches the teat cups to the cows' teats and the milking proceeds as described in my aforesaid patents. When the milking is completed, the operator merely detaches the tube 113 from the bucket, permits it to drop down, thereby cutting off the vacuum, then removes the teat cups from the teats, unhooks the bucket from the surcingle, unhooks the surcingle and hangs it back on the pin 109 and pulls the hand grip 83, thereby opening both gates, which permits the cow which has been milked to pass out of the stall, the opened gate 51 serving to deflect the next cow into the stall. As soon as the cow has left the stall the operator pulls the hand grip 77, thereby closing the exit gate 52 at the front of the stall. The operator also pulls the handle 97 which discharges a bait into the feed box for the next cow.

Figure 3:
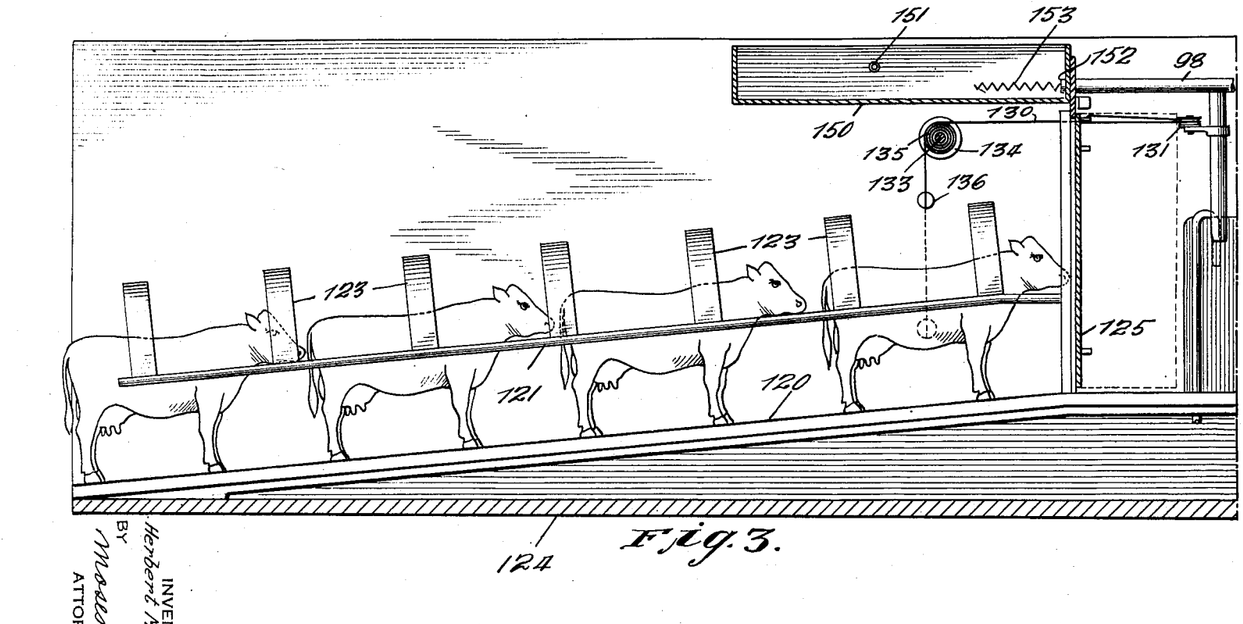
Figure 3 is a vertical sectional view taken on the line 3—3 of Figure 1, showing the inclined runway by which the cows approach the milking room.
Figure 4:
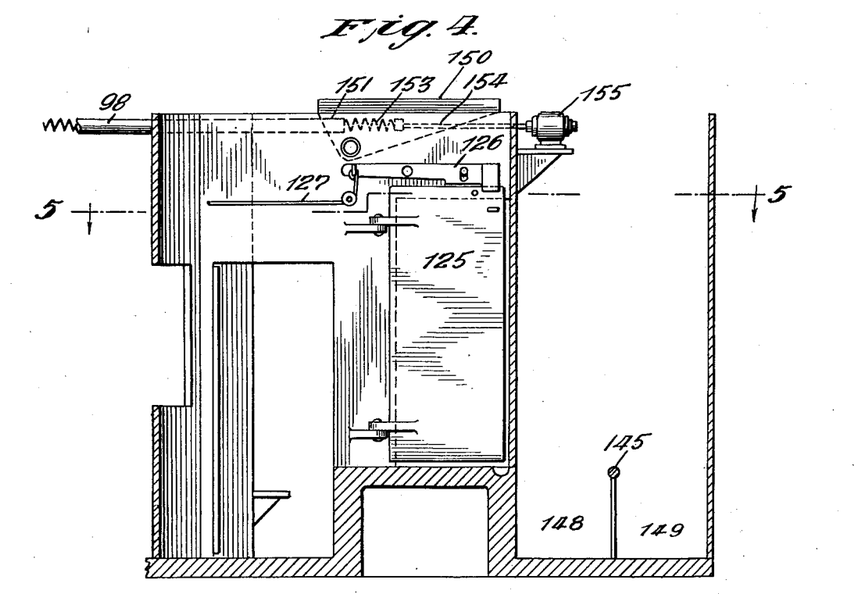
Figure 4 is a vertical section on line 4—4 of Figure 1, looking in the direction of the arrows.
Figure 5:
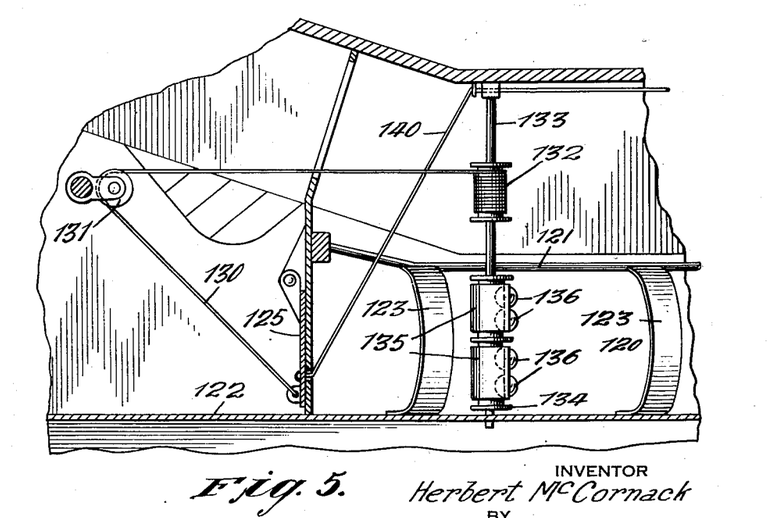
Figure 5 is a sectional plan view on line 5—5 of Figure 4.
Figure 6:
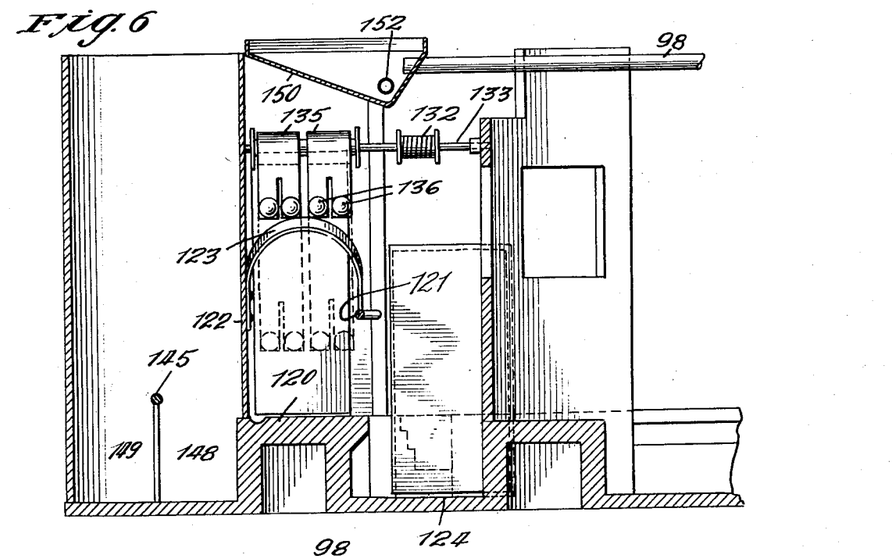
Figure 7:
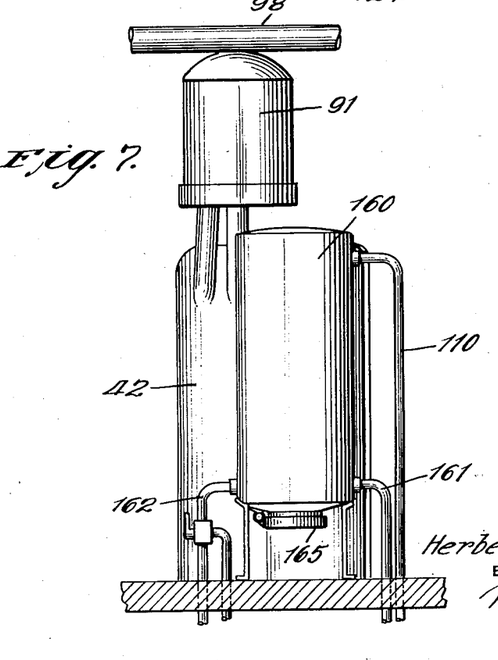
Figure 7 is a detail view in elevation, showing the self-draining vacuum tank for the milking system and one of the feed measuring receptacles.
Figure 8:
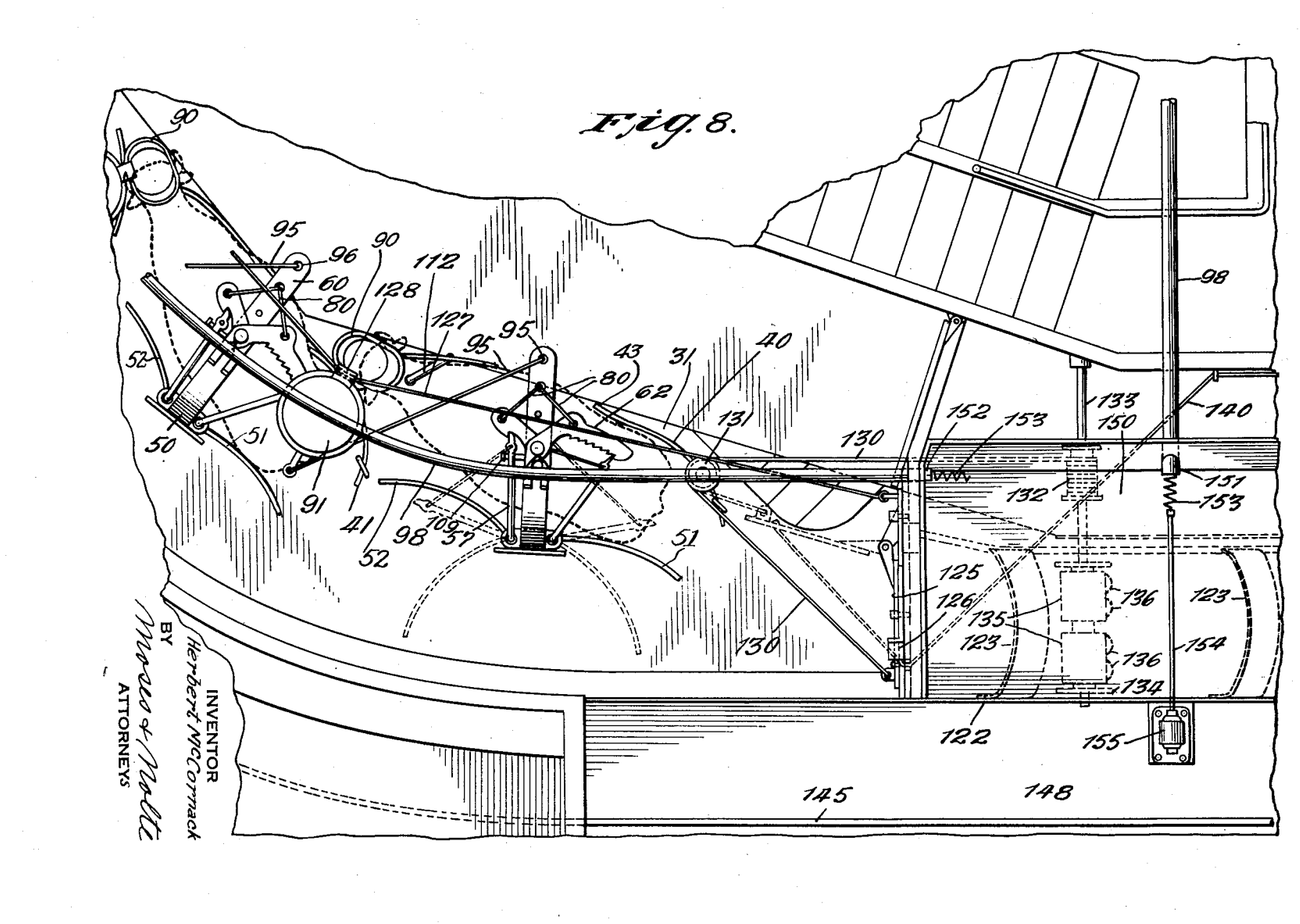
Figure 8 is a plan view on an enlarged scale showing one of the milking stalls and parts of another stall and also showing the entrance door.

The cows enter the milking room and reach the elevated milking bench 31 by means of a ramp 120. The cows are confined to a single line in their passage up this ramp by means of a guard rail 121 secured to the wall 122 by means of overhead braces 123. This leaves the lower parts of the cows exposed on the side away from the wall 122 without any interference by supports of any kind. Along the side of the ramp 120 is a horizontal floor 124 where an inspector can stand and conveniently wash off the cows' udders and inspect the teats as the cows pass up the ramp. When the cows reach the stalls they are, therefore, ready for immediate application of the milking machines. Entrance to the milking room is guarded by a swinging door 125 which is normally held closed by a pivoted latch 126 (Figure 4), this latch being controlled by a pull cord 127 which passes around through guides 128 above the stalls so that the milking operator can grasp the cord at whatever position he may be and release the latch when he has an empty stall ready for the reception of another cow. When the latch is released the door is pulled open by a cord 130 which passes around a pulley 131 (Figure 5) to a drum 132 fixed on a shaft 133. Also fixed on the shaft 133 above the cow ramp is a drum 134 which carries a weighted curtain 135, shown as made in two sections. The ends of each curtain section are also divided into two parts, each carrying a weight 136 so that four weighted tabs are provided on the bottom of the curtain. When the latch is released the weights draw down the curtain, at the same time winding up the cord on the drum 132 and swinging open the door 125. At this time there will be a cow standing beneath the curtain as shown in Figure 3 and the curtain descending on the cow's back will cause the cow to start forward through the door 125. As the cow passes out from under the curtain, the latter will be lowered in front of the head of the following cow, thereby stopping that cow until the door is again closed and the curtain rises. For closing the door 125 a cord 140 is provided which passes alongside of the passageway for the inspector standing on the floor 124. This inspector as soon as he sees that a cow has passed through the door 125 pulls the cord 140, thereby closing the door and raising the curtain so that the next cow will advance to a position behind the closed door ready to enter the milking room when the milking operator is ready for her.

The cows come in single file through a passageway from the cow barn and pass up the ramp 120, where they are washed off and enter one at a time through the door 125 as described. After each cow is milked, she passes out through the opened gate 52 of the stall where she has been milked and walks to the end of the circular passage outside of the stalls and is guided by a guide rail 145 around to the outside of the curved wall 146 of the milking room and passes down an inclined passage 147 to a runway 148 parallel with the ramp 120 by which she entered the milking room and returns through a passageway to the cow stable. A passageway 149 outside of the passageway 147 permits an operator to walk around when necessary for the purpose of cleaning the passageway 147 and to urge the cows along in case for any reason they hesitate on their way back to the cow stable.

For delivering food to the several food reservoirs 91 I preferably employ a conveying mechanism adapted to convey a continuous supply of food through the conveyor tube 98 so as to keep the reservoirs 91 full at all times, any surplus food carried by the conveyor being returned to the source of supply, as illustrated, an elevated food bin 150, into which both ends of the conveyor tube 98 open, as indicated at 151 and 152, respectively. Mounted in the conveying tube is the conveying member which, in the construction illustrated, is in the form of a flexible coiled spring member 153 which constitutes a screw conveyor. One end of this screw member is connected by a shaft 154 with a motor 155 by which it is continuously rotated. Properly comminuted food is placed in the bin 150 and is continuously fed by the screw 153 into the end 151 of the tube 98 and is carried around through the tube, enough of it being discharged into each of the food reservoirs 91 to keep the latter substantially filled at all times. The remainder of the food is carried back and discharged into the bin through the end 152 of the tube and is again circulated, food being added to the bin 150 from time to time to keep the same properly filled. In this way the operator is sure that all of the reservoirs 91 are filled so that whenever he requires a supply of food for any food box 90 he merely pulls the handle 97 opposite the corresponding stall and delivers a measure of food to the food box.

The vacuum pipe 110 which extends around under the stalls is preferably connected with a vacuum tank 160 of the type shown in my Patent Number 1,393,387. This vacuum tank has a connection 161 to a vacuum pump, not shown, and is also provided with a water connection 162 by which it may be readily flushed. At the bottom of the tank 160 is a pivoted door 165 which is held closed so long as the system is in operation but which drops open by gravity as soon as the vacuum is shut off, thereby automatically draining the tank. The accumulation in the tank of any milk which may be drawn into the vacuum system in the form of foam or otherwise is thus prevented.

Figure 17:
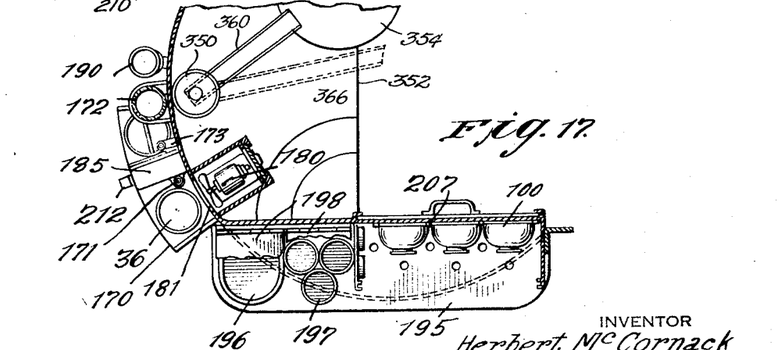
Figure 17 is a partial horizontal section on line 17—17 of Figure 16.
Figures 18, 19, 20, 21, 22:
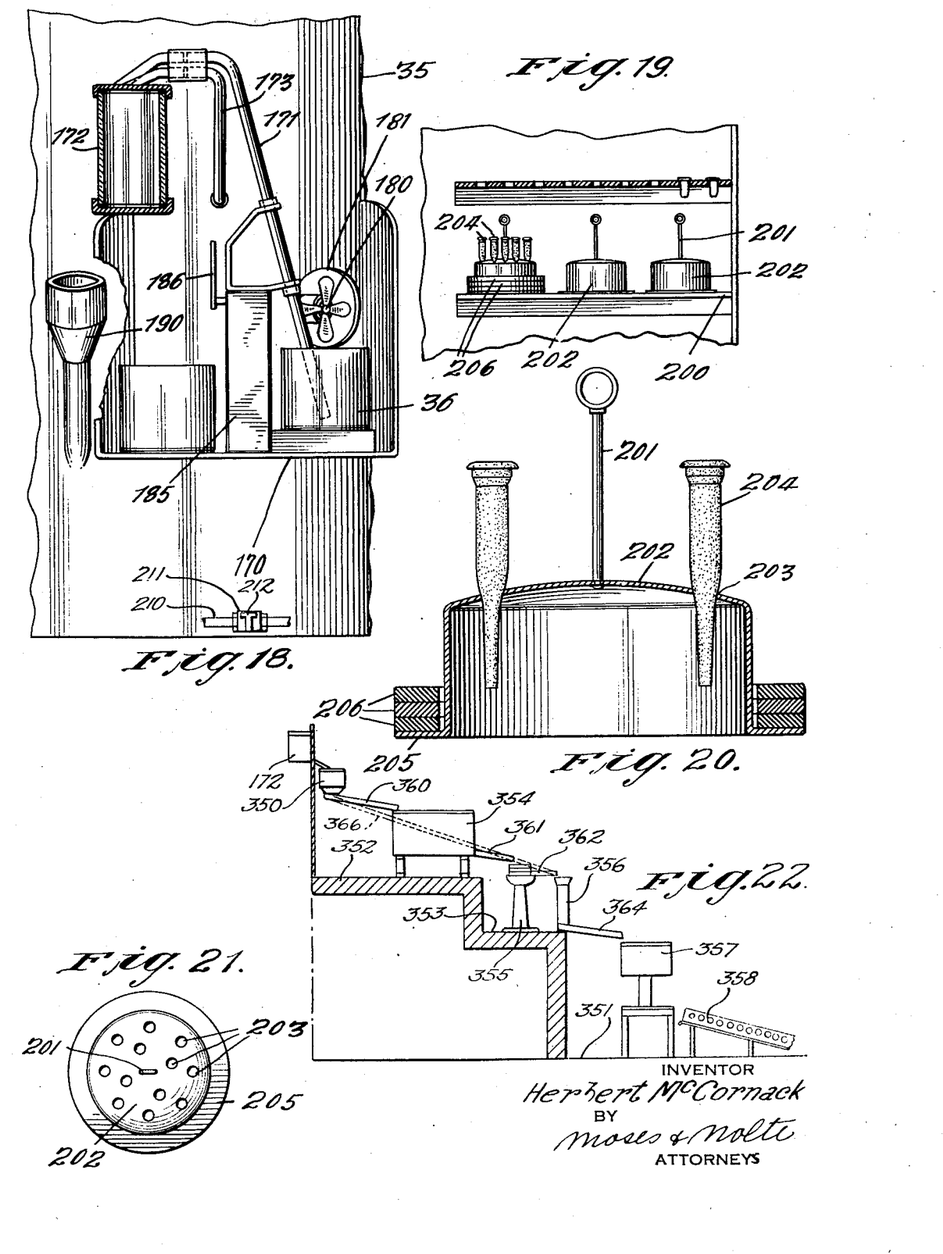
Figure 18 is a view in side elevation, parts being shown in section, of the means for receiving the milk from the buckets and conveying it to the interior of the milk receiving room.
Figure 19 is a view in side elevation showing the holders where are kept the cup inflations and rubber sealing rings when not in use, a bracket for holding the metal parts of the cups being shown in section.
Figure 20 is a view in vertical section of one of the holders for the rubber parts.
Figure 21 is a plan view of the same with the rubber parts removed.
Figure 22 is a diagrammatic view in vertical section taken approximately on line 22—22 of Figure 1 showing the arrangement of the various milk handling instrumentalities by which the gravity flow of the milk is obtained throughout the milk receiving room.

For receiving the milk from the milking machine buckets, a receptacle 36 is provided which is mounted on scales on a shelf 170 on the side of the central milk receiving chamber or room 35. Means are provided for automatically weighing the milk and delivering the same to the interior of the milking room. The milk is drawn from the receptacle 36 through a pipe 171 to a glass chamber 172 to which is connected a vacuum pipe 173 (Figure 17). In order to keep flies and dust away from the milk receiving receptacle 36, a fan 180 is mounted in an opening 181 in the wall of the milk receiving room immediately above the receptacle 36. This fan draws fresh, cool air either from the inside of the milk receiving room or through the duct 182 and blows it out over the top of the receptacle 36. The scales for weighing the milk are indicated diagrammatically at 185 and means are provided adjacent thereto upon which the operator may enter the number of the cow, the condition of the cow's teats, and the weight of the milk given by the cow. As soon as the operator has weighed the milk and made the record stated, he pulls the handle 186 which turns on the vacuum to the pipe 173 and the milk is drawn from the receptacle 36 which is then ready to receive the milk from the next cow. In the event that any cow is found to have her udder in an unhealthy condition, the milk from that cow is not poured into receptacle 36 but a funnel 190 is provided into which such milk is poured and it passes to a suitable container in the milk receiving room. The milk withdrawn from the receptacle 36 is carried into the interior of the milk receiving room where it passes through suitable coolers, separators, pasteurizers, or any other desired apparatus to the bottling machine, such apparatus not being illustrateed in detail herein. Preferably, the arrangement is such that the milk can pass by gravity through all of this apparatus.

Owing to the circular arrangement of the stalls and to the location of the milk receiving and weighing means in a position towards the center of the room and owing to the convenient arrangement of the controls for the stall gates and other parts of the apparatus, it is possible for a single operator to handle the milking of the cows in all of the stalls, attaching and removing the milking units from the cows, and to pour the milk from the buckets into the receptacle 36, weigh the same and make the necessary entries. Another operator standing on the floor 124 alongside of the cow ramp is able to clean and inspect the udders of all cows, and a third operator in the milk receiving room 35 is able to handle the milk received in that room throughout all of the operations performed therein to and including bottling. It is thus possible for three operators to do the entire work in a milking plant of the size illustrated.

Means for washing and racking the parts of the milking units are preferably provided on the outer wall of the milk receiving room 35. As here illustrated, a shelf 195 is provided on which are receptacles 196 and 197 for washing solutions, hinged covers 198 being preferably provided for these receptacles. Above the shelf 195 is another shelf 200 carrying holders 201 for the rubber parts of the units. These holders (Figures 18, 19, 20) comprise inverted dome-shaped members 202 having holes 203 in their tops into which are placed the teat cup inflations 204. The dome-shaped members have outwardly extending bottom flange 205 upon which the rubber sealing washers 206 for the bucket lids are placed. The holders 201 carrying these rubber parts may then be dipped into the solution receptacle 196 and all the rubber parts washed off, after which they are set on the shelf 200 to dry. A chamber 207 adapted to be closed by a sliding door 208 is provided to receive the buckets 100 and their lids 106, the buckets being supported in vertical position between brackets 209.

Figure 1:
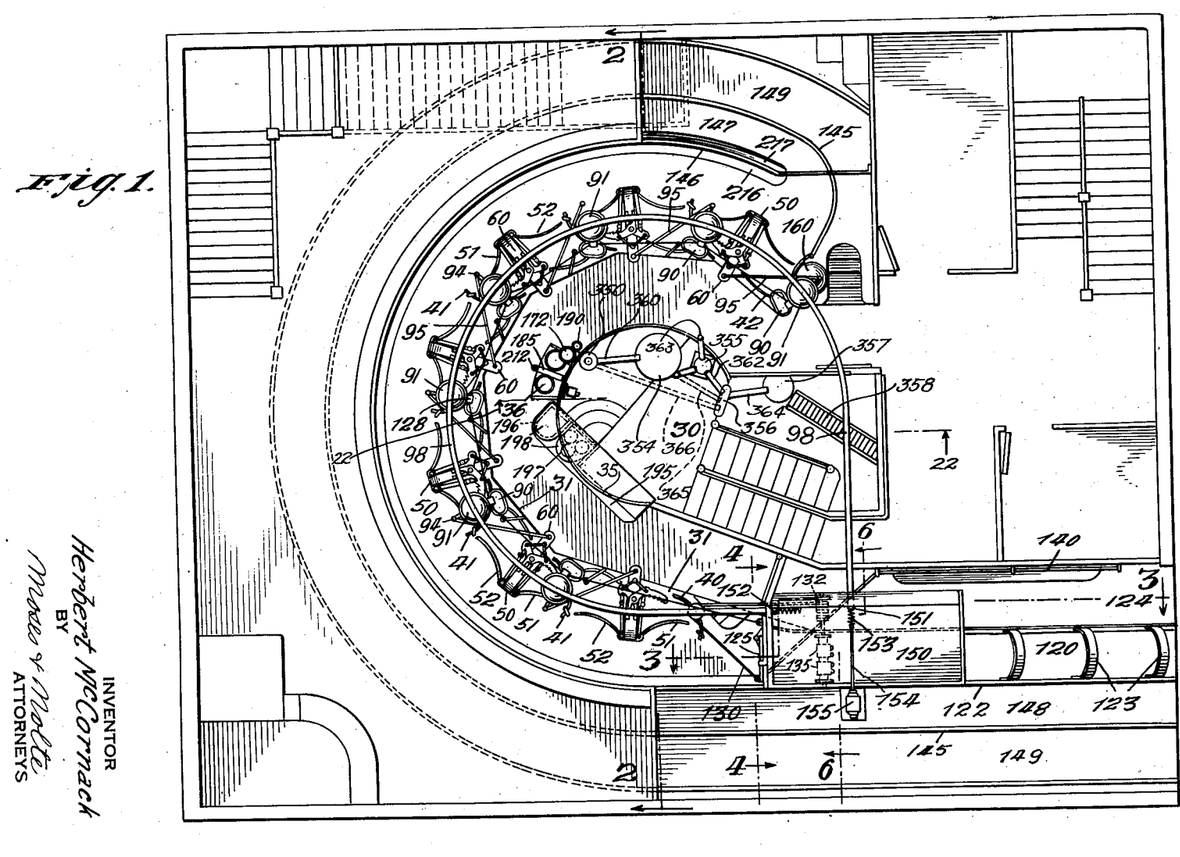
Figure 1 is a plan view of one form of milking room embodied in my invention.
Figure 2:
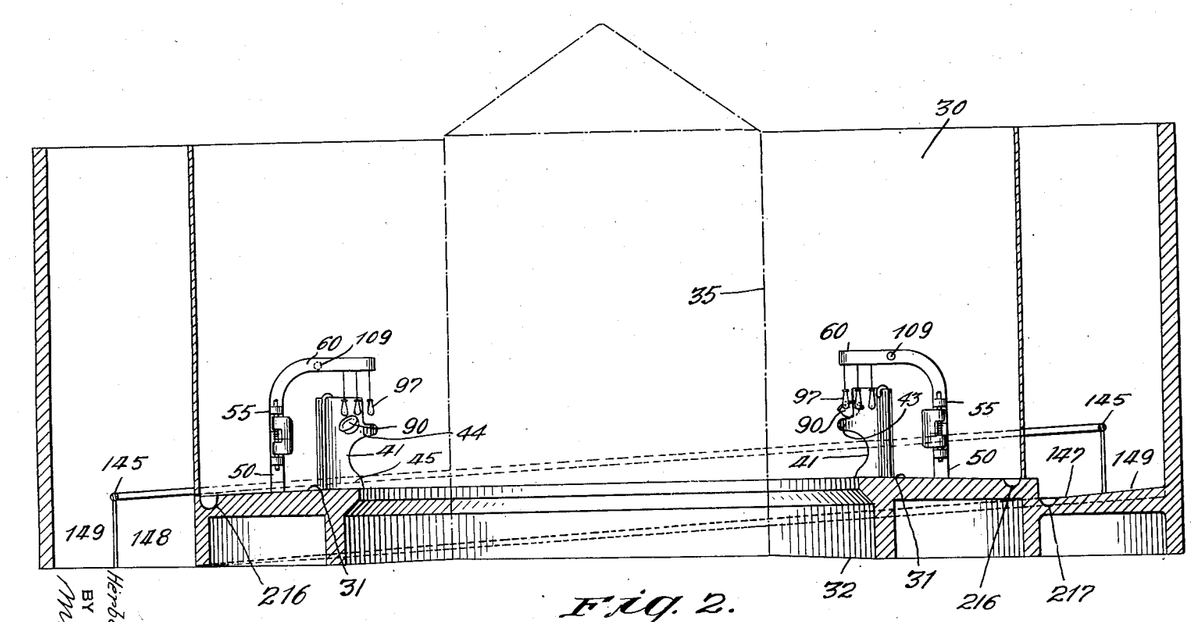
Figure 2 is a vertical sectional view taken on line 2—2 of Figure 1, the milk receiving room being indicated diagrammatically in broken lines.

The maintenance of sanitary conditions within the milking room is important and I provide means by which this result may be accomplished with ease and certainty. A water main 210 extends around under the stalls and is controlled by a valve 211 which is preferably located adjacent to the milk receiving receptacle 36, it being provided with a foot pedal 212 for convenient operation by the operator. Connected with the water main 210 are branch pipes 215 having their ends bent over the top of each of the shields 40 and 41 so that when the water is turned on it will be delivered in such a way as to wash down the surfaces of such shields and keep them clean. The surface of the milking bench 31 slopes slightly outward as shown in Fig. 2 and around its outer margin is a gutter 216. The water flowing from the pipes 215, flushes off the surface 31 and carries all refuse into this gutter from which it flows by gravity to a suitable outlet. The gutter 217 also extends alongside of the passageway 147. Preferably all this wash water and refuse carried thereby, together with any liquid excrement discharged by the cows are washed through a suitable duct to a manure basin to be described.

Figure 23:
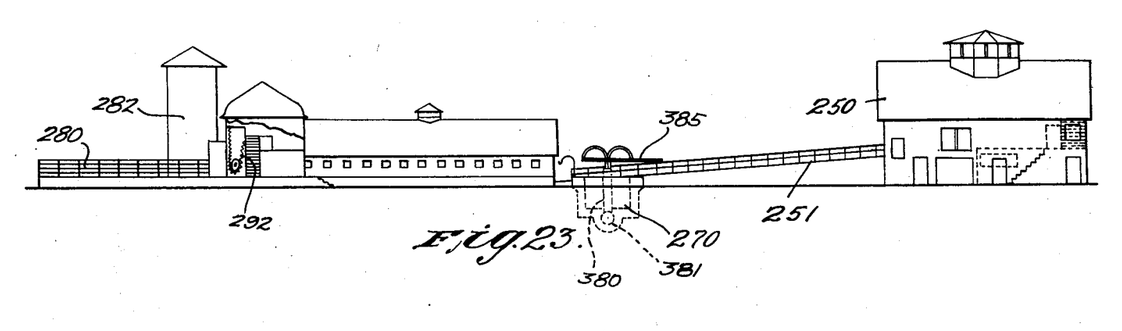
Figure 23 is a diagrammatic side elevation of a complete dairy plant lay-out including the stables and milking house.
Figure 24:
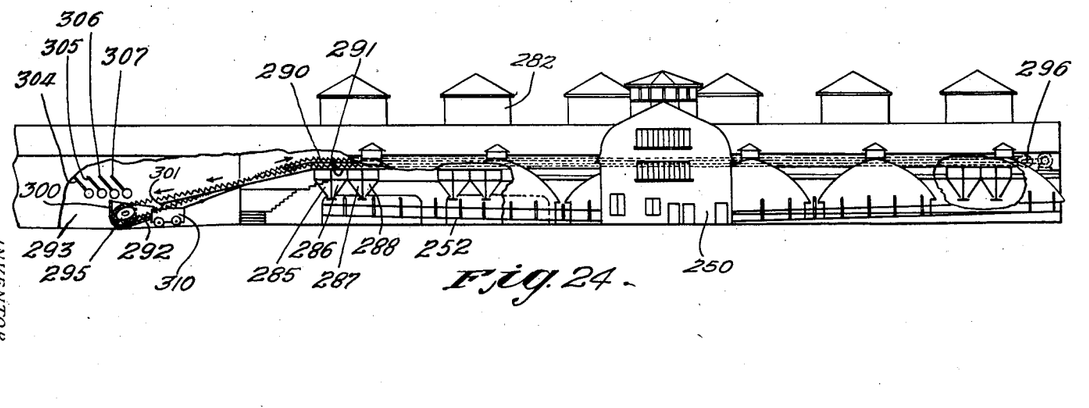
Figure 24 is a front elevation of the same, parts of the stables being shown in vertical section.
Figure 25:
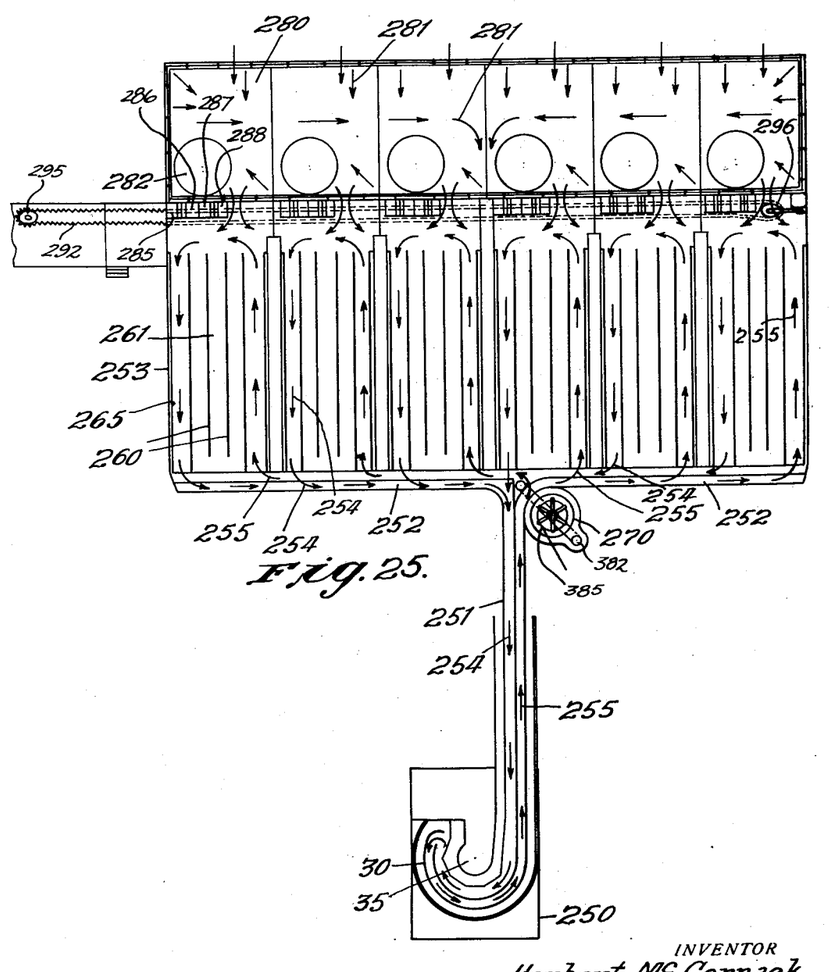
Figure 25 is a diagrammatic, sectional, plan view of the lay-out shown in Figures 23 and 24.

In Figures 23, 24 and 25 I have shown diagrammatically a complete layout of a dairy plant embodying the features above described together with an arrangement of stables provided with a novel feed distribution system and manure drainage system. The milk house 250 contains the milking room 30 of the form already described which is located on the second floor of the milk house and which the cows reach by a ramp 251 which forms a continuation of the ramp 120 in the milk house. The milk coolers, separators, pasteurizers and bottling machines are located in the milk receiving room 35 which extends to the ground floor of the milk house so that the milk which is delivered on the second floor can pass by gravity through the various stages of treatment to final bottling and delivery. All pumps or other instrumentalities for elevating the milk during treatment are thus avoided, this being made possible by performing the milking at a raised elevation which is reached by the cows walking up a ramp. As shown diagrammatically in Figures 1 and 22, the milk passes from the receptacle 172 into the interior of the milk receiving room where it is received by a strainer 350. The interior of the milk receiving room has a ground floor 351 and a series of elevated benches indicated at 352 and 353. Mounted on the upper bench 352 is a pasteurizer indicated diagrammatically at 354 and mounted on the bench 353 are a separator 355 and a cooler 356. On the ground floor 351 is mounted a bottler 357 from which leads a bottle conveyor 358. Various courses may be provided for the milk depending upon whether it is desired to pasteurize it, separate it, etc., but all of such courses are so arranged that the milk will flow by gravity without the necessity of pumping or lifting. For instance, the milk may be carried from the strainer 350 to the pasteurizer through a duct 360. From the pasterizer the milk passes through a duct 361 to the separator, the cream passing from the latter through the pipe 362 to the cooler, while the skim milk may be discharged to a vat (not shown) through a spout (not shown). From the cooler the cream passes through a spout 364 to the bottler. If it is desired to pasteurize the milk and not to separate it, the milk passes directly from the pasteurizer to the cooler through a duct 365 shown in dotted lines in Figure 1. However, if it is desired neither to pasteurize nor separate the milk, it may be passed directly from the strainer to the cooler through a duct 366 shown in dotted lines. Other alternative arrangements may be made as desired. Ramp 251 connects with lanes 252 for the cows coming from the stables 253 and returning from the milk house to the stables, the paths of the cows passing from the stables to the milk house being indicated by arrows 254, the paths of the returning cows being indicated by arrows 255. The stables are provided with rows of stanchions indicated diagrammatically by the lines 260 between which are the manger spaces 261. The cows' stalls and the lanes for providing access to the stalls are so graded and guttered as to drain laterally towards the side walls of the stables where waterpipes indicated diagrammatically by the lines 265 are provided, and all of the surfaces and gutters also drain towards the lanes 252 at the front of the stables which are also suitably guttered and provided with waterpipes if necessary, so that all of the manure may be flushed, with or without the aid of brooms, towards the front of the stables. The lanes 252 slope, as indicated in Figure 24, in the general direction of the ramp 251, adjacent to which is located a manure basin 270. Back of each of the stables a cow yard 280 is provided, these cow yards being also graded so that the drainage will be in the general direction indicated by the arrows 281, between the central stables and to the manure basin. Adjacent to each of the stables a silo 282 is preferably located.

The provision of a manure basin into which all of the drainage from the stables, cow yards, milk rooms, and runways takes place is a valuable feature of my dairy plant. Owing to the fact that all of these areas and passageways are flushed with wash water which carries or assists in carrying all of the manure both solid or liquid to the basin, it is possible by a proper construction of the basin to utilize such water to leach out all of the soluble values from the manure which constitute the most useful parts thereof, and thus produce a liquid manure which can be applied cheaply and efficiently to the pasturage immediately surrounding or near the dairy plant, and thus keep the same in a highly enriched condition. As shown diagrammatically in Figures 23 and 25, the manure basin 270 comprises a sunken cylindrical receptacle preferably of concrete in the center of which is a cylindrical strainer or filter 380 which communicates at its lower end with a sump 381 which communicates with a vertical passageway or well 382 shown in Figure 25. The manure and wash water is discharged into the concrete basin and the water and liquid parts of the manure are leached through the filter or strainer into the sump 381 from which they are pumped out through the well 382 by means of a suitable suction pump (not shown) and discharged into tank wagons or other receptacles or spread over the adjacent pasturage by means of any desired form of liquid manure spreader (not shown). The solid parts of the manure may be removed from the basin in any suitable manner as by means of a grapple (not shown) adapted to be suspended from a track 385.

Located near the rear wall of each of the stables is a series of hoppers 285, 286, 287 and 288 for holding supplies of the various kinds of feed which it may be desired to provide for the cows, such for instance as ground feed, chopped hay, beet pulp, etc. In order to keep these hoppers supplied at all times with the several feeds, I preferably provide the conveyor arrangement shown diagrammatically in Figures 24 and 25. As here illustrated conveyor troughs 290 and 291 extend throughout all of the stables, an endless conveyor 292 being provided which travels along these troughs from the feed storage room 293. The conveyor may be of any suitable construction, but I have found that an endless flexible member formed of spiral construction, like a spiral spring, running over pulleys 295 and 296 is satisfactory. In the feed storage room is a receiving hopper 300 into which the lower end of the conveyor dips and to which the different kinds of feed and bedding are conveyed by a truck 310. Corresponding to storage hoppers 285, 286, 287 and 288 are control levers 304, 305, 306 and 307 in the storage room, each of which by simple mechanism (not shown) serves to operate a series of outlets in the trough 290, preferably slide controlled in a well understood manner, which open into their respective hoppers. To operate this distributing system, the operator, for instance, by throwing control lever 305 opens simultaneously all outlets from trough 290 into the hoppers throughout the stables in series 285. He then shovels from the truck 310 the kind of feed to be delivered to hoppers 285. The conveyor carries the feed from receiving hopper 300 along trough 290 and discharges it from the trough into the first storage hopper in series 285 which is not full. When this hopper is full the feed overflows to the next hopper which is not full and so on until all of this series of hoppers are full. The excess supply is then returned back along trough 291 to discharge outlet 301 where it is discharged into the supply truck 310.

When the overflow feed thus begins to return to the truck 310, the operator stops shoveling feed into the receiving hopper and the conveyor sweeps all of the feed from the receiving hopper 300 and from the conveyor troughs 290 and 291 and the distributor is then cleared and ready to handle another variety of feed. In this same way each of the several series of storage hoppers is filled with their respective kinds of supplies from the common receiving hopper 300 and the overflow excess is carried back to the storage room. It should be noted that with this system of distribution the hoppers are not necessarily filled in consecutive order but should any one or more of the hoppers, in the series, be drawn upon and emptied or partly empties any or all of such hoppers will be successively refilled and the excess overflow returned to the source of supply. By this arrangement a single operator in the feed room is enabled to keep all of the stables supplied at all times with the various feeds required for the cows and, with the facilities here provided, also have sufficient time to distribute the feed to the individual cows.

While I have illustrated and described in detail certain preferred forms of my invention, it is to be understood that changes may be made therein and the invention embodied in other structures. I do not, therefore, desire to limit myself to the specific construction illustrated, but intend to cover my invention broadly in whatever form its principles may be utilized.

I claim:

1. In a milking plant having a station for the operator, a series of milking stalls each having a feed box at the head end thereof alongside the operator's station and each having confining members so arranged that the cow in one stall overlaps the hip of the cow in each stall except the rearmost is required to stand so that her hips extend alongside the head of the cow behind her and at the side thereof remote from the operator's station.

2. In a milking plant having a station for the operator, a series of milking stalls having confining members so arranged that the cow in each stall except the rearmost is required to stand so that her hips extend alongside the head of the cow behind her and at the side thereof remote from the operator's station, and each stall including a shield or guard interposed between the hip of the cow ahead and the head of the cow behind her.

3. In a milking plant having a station for the operator, in combination, a series of stalls, a runway for the cows at the side of the stalls remote from the operator's station, from which the cows enter the stall, the stalls being so arranged that the cow in each stall except the rearmost is required to stand so that her hips extend alongside the head of the cow behind her and at the side thereof remote from the operator's station.

4. In a milking plant having a station for the operator, a series of milking stalls each having a feed box at the head and thereof alongside the operator's station and each having confining members so arranged that the cow in each stall except the rearmost is required to stand so that her hips extend alongside the head of the cow behind her and at the side thereof remote from the operator's station, each stall including a shield or guard interposed between the hip of the cow ahead and the head of the cow behind her, and the feed receptacle of each stall being supported on said shield or guard of the stall ahead.

5. In a milking plant, a series of milking stalls, each provided with a feed box, a feed reservoir for each of said feed boxes, a common source of supply, and a conveyor which withdraws feed from said source and keeps each reservoir filled with feed and returns the excess or overflow to the source of supply.

6. In a milking plant, a series of stalls arranged along a lane of approach, an entrance door to said lane, a latch for said door, a curtain arranged to close about the rear of the first cow at the entrance door for the purpose of detaining the cow following, a floor adjacent the stalls, means whereby the milking machine operator can, from the floor, unlatch said entrance door, and means automatically causing the door to be opened and the curtain to be closed upon the unlatching of the door.

7. In a milking plant, a series of stalls arranged along a lane of approach, an entrance door to said lane, a latch for said door, a curtain arranged to close about the rear of the first cow at the entrance door for the purpose of detaining the cow following, a floor adjacent the stalls, means whereby the milking machine operator can, from the floor, unlatch said entrance door, automatic means whereby the door is opened and the curtain is closed when the door is unlatched, and means on the approach side of the entrance door for closing said door and simultaneously raising said curtain for the approach of the next cow.

8. In a milking plant, a milking stall provided with an entrance gate so arranged that when it is being closed it presses against the cow's hip and causes her to step over to a position convenient to be milked from the side of the stall opposite the gate and means operable from the side of the stall opposite the gate for drawing the gate toward the cow and locking it at any desired position.

9. In a milking plant, a milking stall provided with an entrance gate so arranged that when it is being closed it presses against the cow's hip and causes her to step over to a position convenient to be milked and a guard mounted adjacent to the floor near the rear end of the stall so arranged that it extends in front of the cow's rear foot and causes her to keep her foot rearward on the operator's side in convenient position to be milked.

10. In a milking plant, a floor for a milking machine operator, a series of milking stalls so arranged that the heads of the cows overlap the hips of the cows in front of them on the side next to said floor, sanitary shields arranged at the rear of each cow and means for flushing all shields and the floor of the stalls.

11. In a milking plant, a raised milking room having a series of stalls arranged around a central space, a milk receiver in said central space, a milk receiving room containing milk treating devices at a lower level than said milking room and communicating with the receiver whereby milk taken from the cows in said milking room can be passed through said milk treating devices by gravity, and a ramp by which the cows may walk to said elevated milking room.

12. In a milking plant having a station for the operator, a series of milking stalls each having a feed box at the head end thereof alongside the operator's station and each having confining members so arranged that the cows in all the stalls are required to stand with their heads and shoulders substantially tangent to a common circle and that the hips of the cow in each stall are disposed alongside the head of the cow behind her at the side remote from the center of said circle.

HERBERT McCORNACK.